United States Patent
Kwon et al.

(10) Patent No.: US 11,657,974 B2
(45) Date of Patent: May 23, 2023

(54) MULTILAYER CERAMIC CAPACITOR

(71) Applicant: SAMSUNG ELECTRO-MECHANICS CO., LTD., Suwon-si (KR)

(72) Inventors: Byeong Chan Kwon, Suwon-si (KR); Ji Hong Jo, Suwon-si (KR); Min Gon Lee, Suwon-si (KR); Jin Kyung Joo, Suwon-si (KR); Taek Jung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/694,045

(22) Filed: Mar. 14, 2022

(65) Prior Publication Data

US 2022/0199329 A1    Jun. 23, 2022

Related U.S. Application Data

(63) Continuation of application No. 16/879,895, filed on May 21, 2020, now Pat. No. 11,322,304.

(30) Foreign Application Priority Data

Jul. 5, 2019    (KR) ................. 10-2019-0081301

(51) Int. Cl.
*H01G 4/008*    (2006.01)
*H01G 4/232*    (2006.01)
(Continued)

(52) U.S. Cl.
CPC ........... *H01G 4/2325* (2013.01); *H01G 4/008* (2013.01); *H01G 4/248* (2013.01); *H01G 4/30* (2013.01); *H01G 4/1227* (2013.01)

(58) Field of Classification Search
CPC ...... H01G 4/008; H01G 4/012; H01G 4/1227; H01G 4/232; H01G 4/2325; H01G 4/236;
(Continued)

(56) References Cited

U.S. PATENT DOCUMENTS 9,093,220 B1 * 7/2015 Kitano ................. H01G 4/1218
11,227,722 B2 * 1/2022 Lee ......................... H01G 4/012
(Continued)

FOREIGN PATENT DOCUMENTS

CN    102290235 A    12/2011
CN    103700499 A    4/2014
(Continued)

OTHER PUBLICATIONS

Chinese Office Action dated Jun. 30, 2022, issued in corresponding Chinese Patent Application No. 202010640711.0 (with English translation).

*Primary Examiner* — Timothy J Thompson
*Assistant Examiner* — Guillermo J Egoavil
(74) *Attorney, Agent, or Firm* — Morgan, Lewis & Bockius LLP

(57) ABSTRACT

A multilayer ceramic capacitor includes a body including a dielectric layer and first and second internal electrodes disposed with the dielectric layer interposed therebetween in a stacking direction, and including a first surface and a second surface opposing each other in the stacking direction, a first through electrode penetrating the body and connected to the first internal electrode; a second through electrode penetrating the body and connected to the second internal electrode, first and second external electrodes disposed on the first surface and the second surface, respectively, and connected to the first through electrode, third and fourth external electrodes spaced apart from the first and second external electrodes and connected to the second through
(Continued)

electrode, and an identifier disposed on the first surface or the second surface of the body, and the first and second through electrodes protrude from the first surface of the body.

24 Claims, 11 Drawing Sheets

(51) Int. Cl.
*H01G 4/248* (2006.01)
*H01G 4/30* (2006.01)
*H01G 4/12* (2006.01)

(58) Field of Classification Search
CPC .......... H01G 4/248; H01G 4/252; H01G 4/30; H01G 4/385
USPC ......... 361/301.4, 306.3, 321.4, 321.2, 321.5; 174/260
See application file for complete search history.

(56) References Cited

U.S. PATENT DOCUMENTS

| | | | |
|---|---|---|---|
| 11,322,304 B2 * | 5/2022 | Kwon | .................... H01G 4/008 |
| 2009/0207554 A1 | 8/2009 | Iguchi et al. | |
| 2011/0135464 A1 | 6/2011 | Luo et al. | |
| 2011/0290542 A1 | 12/2011 | Nishisaka et al. | |
| 2013/0020913 A1 | 1/2013 | Shirakawa et al. | |
| 2014/0020942 A1 | 1/2014 | Cho et al. | |
| 2014/0083755 A1 | 3/2014 | Lee et al. | |
| 2014/0104750 A1 | 4/2014 | Ahn et al. | |
| 2014/0160617 A1 | 6/2014 | Kim et al. | |
| 2014/0182911 A1 * | 7/2014 | Lee | ........................ H05K 1/185 29/832 |
| 2017/0345564 A1 * | 11/2017 | Ryu | ..................... H01G 4/2325 |
| 2018/0027656 A1 | 1/2018 | Jung et al. | |
| 2020/0152386 A1 * | 5/2020 | Togou | .................... H01G 4/224 |
| 2021/0005384 A1 | 1/2021 | Lee et al. | |

FOREIGN PATENT DOCUMENTS

| | | | | |
|---|---|---|---|---|
| CN | 103730254 A | | 4/2014 | |
| CN | 104979096 A | | 10/2015 | |
| CN | 107644735 A | | 1/2018 | |
| CN | 112185700 A | | 1/2021 | |
| CN | 112185702 A | | 1/2021 | |
| JP | 2004-281957 A | | 10/2004 | |
| JP | 2004281957 A | * | 10/2004 | ............... H01G 4/12 |
| JP | 2009-200168 A | | 9/2009 | |
| JP | 2010-177508 A | | 8/2010 | |
| JP | 2013-026392 A | | 2/2013 | |
| JP | 2018-056600 A | | 4/2018 | |
| KR | 10-2014-0012577 A | | 2/2014 | |
| KR | 10-1376921 B1 | | 3/2014 | |

* cited by examiner

MULTILAYER CERAMIC CAPACITOR

CROSS-REFERENCE TO RELATED APPLICATION(S)

This application is a continuation of U.S. patent application Ser. No. 16/879,895, filed May 21, 2020 which claims the benefit of priority to Korean Patent Application No. 10-2019-0081301 filed on Jul. 5, 2019 in the Korean Intellectual Property Office, the entire disclosure of which is incorporated herein by reference.

TECHNICAL FIELD

The present disclosure relates to a multilayer ceramic capacitor.

BACKGROUND

Electronic devices including a multilayer ceramic capacitor (MLCC) have recently been increasingly used. A greater number of capacitors have been used in smartphones in the 5th generation era, and such capacitors are required to have high capacity. A mounting area of a passive component such as an MLCC and an inductor, however, has decreased as a size of a set product has been reduced, and accordingly, there has been increasing demand for reducing a size of a passive component. In accordance with the demand, an MLCC and an inductor may be packaged with an IC and an AP, may be embedded in a substrate, or may be mounted on a lower end of an AP in a form of LSC to improve mounting flexibility.

Accordingly, a mounting area may decrease, and ESL occurring in a substrate may also decrease. Thus, there has been increasing demand for an MLCC product having a reduced size.

However, when a lower surface electrode is applied to an embedded capacitor, a surface-mount capacitor, and the like, having a reduced thickness, cohesion force between a lower surface electrode and a metal plating layer may decrease.

SUMMARY

An aspect of the present disclosure is to provide a multilayer ceramic capacitor having improved cohesion strength when the multilayer ceramic capacitor is mounted on or embedded in a substrate.

Another aspect of the present disclosure is to provide a multilayer ceramic capacitor having a reduced size and having improved reliability.

According to an aspect of the present disclosure, a multilayer ceramic capacitor includes a body including a dielectric layer and first and second internal electrodes disposed with the dielectric layer interposed therebetween in a stacking direction, and including a first surface and a second surface opposing each other in the stacking direction, a third surface and a fourth surface opposing each other in a width direction, and a fifth surface and a sixth surface opposing each other in a length direction, a first through electrode penetrating the body and connected to the first internal electrode; a second through electrode penetrating the body and connected to the second internal electrode, first and second external electrodes disposed on the first surface and the second surface, respectively, and connected to the first through electrode, third and fourth external electrodes spaced apart from the first and second external electrodes and connected to the second through electrode, and an identifier disposed on the first surface or the second surface of the body, wherein the first and second through electrodes protrude from the first surface of the body.

According to another aspect of the present disclosure, a multilayer ceramic capacitor includes a body including a dielectric layer and first and second internal electrodes disposed with the dielectric layer interposed therebetween in a stacking direction, and including a first surface and a second surface opposing each other in the stacking direction, a third surface and a fourth surface opposing each other in a width direction, and a fifth surface and a sixth surface opposing each other in a length direction, a first through electrode penetrating the body and connected to the first internal electrode; a second through electrode penetrating the body and connected to the second internal electrode, first and second external electrodes disposed on the first surface and the second surface, respectively, and connected to the first through electrode, and third and fourth external electrodes disposed on the first surface and the second surface, respectively, to be spaced apart from the first and second external electrodes and connected to the second through electrode, wherein the first surface has different brightness or color from the second surface.

According to still another aspect of the present disclosure, a multilayer ceramic capacitor includes a body including alternately stacked first internal electrodes and second internal electrodes laminated with dielectric layers interposed therebetween; first and second through-electrodes penetrating through the body to respectively be connected to the first and second internal electrodes; and first and second external electrodes disposed on a first surface of the body and respectively connected to the first and second through-electrodes, wherein each of the first and second through-electrodes protrudes outwardly from the body through the first surface to respectively contact the first and second external electrodes, and each of the first and second external electrodes has a first surface disposed on the first surface of the body, and a cavity extending from the first surface thereof to accommodate a portion of a respective one of the first and second through-electrodes protruding outwardly from the body.

BRIEF DESCRIPTION OF DRAWINGS

The above and other aspects, features, and advantages of the present disclosure will be more clearly understood from the following detailed description, taken in conjunction with the accompanying drawings, in which:

FIG. 3A is a cross-sectional diagram illustrating a first internal electrode, and FIG. 3B is a cross-sectional diagram illustrating a second internal electrode;

FIG. 6A is a cross-sectional diagram illustrating a first internal electrode, and FIG. 6B is a cross-sectional diagram illustrating a second internal electrode;

FIG. 7A is a cross-sectional diagram illustrating a first internal electrode, and FIG. 7B is a cross-sectional diagram illustrating a second internal electrode;

FIG. 8A is a cross-sectional diagram illustrating a first internal electrode, and FIG. 8B is a cross-sectional diagram illustrating a second internal electrode;

DETAILED DESCRIPTION

Figure 1:
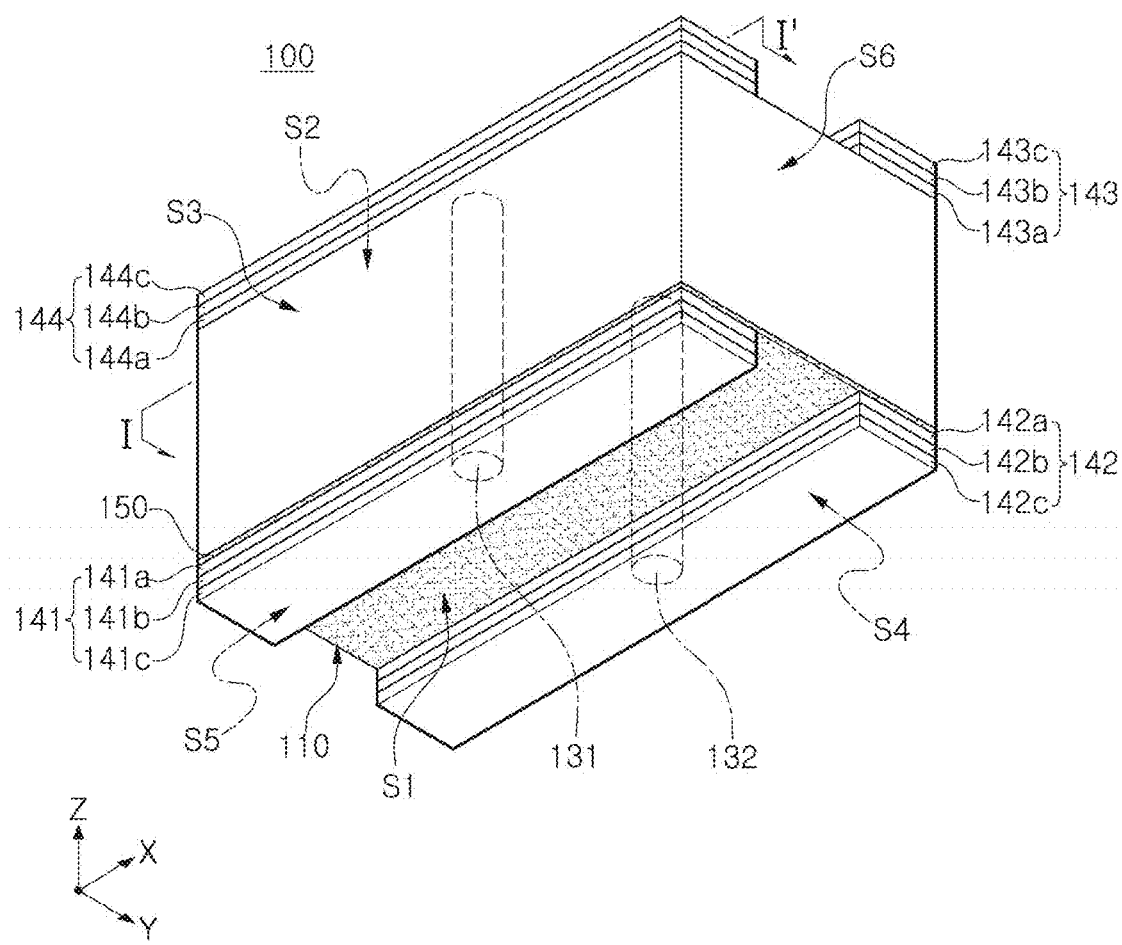
FIG. 1 is a perspective diagram illustrating a multilayer ceramic capacitor according to an exemplary embodiment of the present disclosure.

Hereinafter, exemplary embodiments of the present disclosure will be described as follows with reference to the attached drawings.

These exemplary embodiments are described in sufficient detail to enable those skilled in the art to practice the disclosure. It is to be understood that the various exemplary embodiments of the disclosure, although different, are not necessarily mutually exclusive. For example, structures, shapes, and sizes described as examples in exemplary embodiments in the present disclosure may be implemented in another exemplary embodiment without departing from the spirit and scope of the present disclosure. Shapes and sizes of elements in the drawings may be exaggerated for clarity of description, and the same elements will be indicated by the same reference numerals.

For clarity of description, some elements may be omitted or briefly illustrated, and thicknesses of elements may be magnified to clearly represent layers and regions. It will be understood that when a portion "includes" an element, it can further include another element, not excluding another element, unless otherwise indicated.

In the diagram, an X direction may be defined as a first direction, an L direction, or a length direction, a Y direction may be defined as a second direction, a W direction, or a width direction, and a Z direction may be defined as a third direction, a T direction, or a thickness direction.

In the description below, a multilayer ceramic capacitor will be described in accordance with an exemplary embodiment with reference to FIGS. 1 to 3.

A multilayer ceramic capacitor 100 in the exemplary embodiment may include a body 110 including a dielectric layer 111 and first and second internal electrodes 121 and 122 disposed with the dielectric layer 111 interposed therebetween, and including a first surface S1 and a second surface S2 opposing each other in a third direction, a third surface S3 and a fourth surface S4 opposing each other in a second direction, and a fifth surface S5 and a sixth surface S6 opposing each other in a first direction, a first through electrode 131 penetrating the body 110 and connected to the first internal electrode 121, a second through electrode 132 penetrating the body 110 and connected to the second internal electrode 122, first and second external electrodes 141 and 144 disposed on the first surface and the second surface, respectively, and connected to the first through electrode 131, third and fourth external electrodes 142 and 143 spaced apart from the first and second external electrodes 141 and 144 and connected to the second through electrode 132.

The multilayer ceramic capacitor 100 may further include an identifier 150 disposed on the first surface or the second surface of the body 110, and the first and second through electrodes 131 and 132 may protrude from the first surface of the body 110.

In the body 110, the dielectric layer 111 and the first and second internal electrodes 121 and 122 may be alternately layered. A shape of the body 110 may not be limited to any particular shape, and may have a hexahedral shape or a shape similar to a hexahedron, as illustrated in the diagram. Due to contraction of ceramic powder included in the body 110 during a sintering process, the body 110 may not have an exact hexahedral shape with straight lines, but may have a substantially hexahedral shape.

The body 110 may have the first surface S1 and the second surface S2 opposing each other in a thickness direction (Z direction), the third surface S3 and the fourth surface S4 connected to the first surface S1 and the second surface S2 and opposing each other in a width direction (Y direction), and the fifth surface S5 and the sixth surface S6 connected to the first surface S1 and the second surface S2 and the third surface S3 and the fourth surface S4 and opposing each other in a length direction (X direction). One of the first, second, third, and fourth surfaces S1, S2, S3, and S4 may be configured as a mounting surface.

The plurality of dielectric layers 111 included in the body 110 may be in a sintered state, and the dielectric layers 111 may be integrated such that it may be difficult to identify boundaries between adjacent dielectric layers 111 without using a scanning electron microscope (SEM).

In the exemplary embodiment, a material of the dielectric layer 111 may not be limited to any particular material as long as sufficient capacitance can be obtained. For example, the dielectric layer 111 may be formed using a barium titanate material, a Perovskite material compound with lead (Pb), a strontium titanate material, or the like. The barium titanate material may include a $BaTiO_3$ powder, and an example of the ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), and the like, are partially solidified. As the material of the dielectric layer 111, a barium titanate (BaTiO3) powder, or the like, including various ceramic additives, organic solvents, coupling agents, dispersing agents, and the like, may be used depending on an intended purpose.

First and second cover portions 112 and 113 each having a certain thickness may be formed in a lower portion of a lowermost internal electrode and in an upper portion of an uppermost internal electrode of the body 110. The first and second cover portions 112 and 113 may have the same composition as a composition of the dielectric layer 111, and the first and second cover portions 112 and 113 may be formed by layering at least one or more of dielectric layers which do not include an internal layer in each of an upper portion of an uppermost internal electrode and a lower portion of a lowermost internal electrode of the body 110.

In the exemplary embodiment, the identifier 150 may be disposed on the first cover portion 112 and the second cover portion 113 if desired. The identifier 150 may be formed in one of the first cover portion 112 and the second cover portion 113, and upper and lower portions of the body 110 may be distinguished from each other by the identifier 150 on the basis of a difference in brightness or color. The identifier 150 may be configured as a dielectric layer formed by sintering a single ceramic green sheet or layering a plurality of ceramic green sheets, and may be included in the first cover portion 112 and the second cover portion 113.

A method of providing a difference in brightness or color between the first cover portion 112 and the second cover portion 113 by using the identifier 150 is not limited to any particular method. For example, the identifier 150 may be formed using ceramic particles each having a size different from a size of ceramic particles included in the body, or may be formed by adding one or more metal oxides selected from among Ni, Mn, Cr, Mg, Y, and V, or $BaSiO_3$, $CaSiO_3$, or the like, to a ceramic composition, and the identifier 150 may be marked, or have an engraved portion, using a laser. However, a material of the identifier 150 and a method of forming the identifier 150 may not be limited to the above-described example. By disposing the identifier, an upper portion and a lower portion of the body may be distinguished from each other, and a direction of a protrusion in which the through electrodes protrude may be identified. Thus, the multilayer ceramic capacitor in the example may be mounted on a substrate in a direction in which improved cohesion force is obtained.

In the exemplary embodiment, a thickness of the body 110 may be 100 μm or less. The thickness of the body 110 may refer to a vertical distance between the first surface and the second surface. A lower limit of the thickness is not limited to any particular size, and may be 5 μm or greater, for example. By manufacturing the body 110 to have a thickness of 100 μm or less, the multilayer ceramic capacitor in the exemplary embodiment may be applied to a multilayer ceramic capacitor embedded in a substrate and/or a capacitor mounted on a lower end of an AP in a form of an LSC.

The internal electrodes 121 and 122 may include the first and second internal electrodes 121 and 122 alternately disposed with the dielectric layer 111 interposed therebetween and opposing each other.

Each of the first and second internal electrodes 121 and 122 may include first and second insulating portions 121a and 122a. The first and second insulating portions 121a and 122a may refer to regions in which the first and second internal electrodes 121 and 122 are not disposed, and may configured to connect the first and second internal electrodes 121 and 122 to external electrodes having different polarities. Accordingly, a first connection electrode 131 may be spaced apart from the second internal electrode 122 by the first insulating portion 121a, and the second connection electrode 132 may be spaced apart from the first through electrode 131 by the second insulating portion 122a.

By connecting the first and second internal electrodes 121 and 122 to the first to fourth external electrodes 141, 142, 143, and 144 by the first and second through electrodes 131 and 132, an area of overlap between the first and second internal electrodes 121 and 122 with the dielectric layer 111 interposed therebetween may increase, and accordingly, a capacitance of the multilayer ceramic capacitor 100 may increase.

The first and second internal electrodes 121 and 122 may include a large amount of nickel (Ni), but a composition of the first and second internal electrodes 121 and 122 is not limited thereto. For example, the first and second internal electrodes 121 and 122 may be formed of a conductive paste including one or more materials from among silver (Ag), palladium (Pd), gold (Au), platinum (Pt), nickel (Ni), tin (Sn), copper (Cu), tungsten (W), titanium (Ti), and alloys thereof. As a method of printing the conductive paste, a screen printing method, a gravure printing method, or the like, may be used, but the printing method is not limited thereto.

The first and second through electrodes 131 and 132 may include a large amount of nickel (Ni), but a composition of the first and second through electrodes 131 and 132 is not limited thereto. For example, the first and second through electrodes 131 and 132 may be formed using a conductive paste including one or more materials from among silver (Ag), palladium (Pd), gold (Au), platinum (Pt), nickel (Ni), tin (Sn), copper (Cu), tungsten (W), titanium (Ti), and alloys thereof. A method of forming the first and second through electrodes 131 and 132 is not limited to any particular method. For example, the first and second through electrodes 131 and 132 may be formed by forming a laminate in which the dielectric layer 111, the first internal electrode 121, and the second internal electrode 122 are layered, drilling the body 110 in a third direction (Z direction) using a laser drill, a mechanical pin puncher, and the like, and filling the drilled portion with the above-described conductive paste.

In an exemplary embodiment, the internal electrodes 121 and 122 and the through electrodes 131 and 132 may include the same metal composition. The same metal material may be nickel (Ni), but an exemplary embodiment thereof is not limited thereto. For example, the metal material may include one or more elements from among silver (Ag), palladium (Pd), gold (Au), platinum (Pt), nickel (Ni), tin (Sn), copper (Cu), tungsten (W), titanium (Ti), and alloys thereof. When the internal electrodes 121 and 122 and the through electrodes 131 and 132 of the multilayer ceramic capacitor include the same metal material, sintering initiation temperatures and/or sintering contraction rates of the internal electrodes 121 and 122 and of the through electrodes 131 and 132 may match such that cracks, delamination, and the like, may be prevented.

In the exemplary embodiment, the through electrodes 131 and 132 may protrude in a Z direction. Referring to FIG. 2, the through electrode 131 may protrude from the first surface of the body 110. That is because the through electrode may protrude externally of a through hole of the body 110 due to sintering contraction, and the like, during a process for forming the through electrode. Depending on a size of the protrusion, an air gap may be formed between the electrode and a substrate when the multilayer ceramic capacitor is mounted in or on the substrate, which may cause deterioration of cohesion force. In the multilayer ceramic capacitor in the exemplary embodiment, as the external electrodes are disposed on both the first surface and the second surface of the body, the deterioration of cohesion force caused by the protrusion may be prevented.

In the exemplary embodiment, each of the through electrodes 131 and 132 may have a round shape, but an example of the shape is not limited thereto. Each of the through electrodes 131 and 132 may have a rectangular shape of a triangular shape. Also, the through electrodes 131 and 132 may occupy 5 to 65% of an area of the body in a width direction (Y direction), but an exemplary embodiment thereof is not limited thereto.

In the exemplary embodiment, the first to fourth external electrodes 141, 142, 143, and 144 may be disposed on both surfaces of the body 110. The first and second external electrodes 141 and 144 may be disposed on the first surface S1 and the second surface S2 of the body 110, respectively, and may be electrically connected to each other through the first through electrode 131. The third and fourth external electrodes 142 and 143 may be spaced apart from the first and second external electrodes 141 and 144, may be disposed on the first surface S1 and the second surface S2 of the body 110, respectively, and may be electrically connected through the second through electrode 132.

The multilayer ceramic capacitor 100 configured as above may have improved capacitance by increasing a region in which the first and second internal electrodes 121 and 122 are disposed by reducing margin portions on side surfaces connecting an upper surface and a lower surface of the body 110. Accordingly, in the multilayer ceramic capacitor 100 in the exemplary embodiment, the external electrodes may not be disposed on side surfaces, and the internal electrodes may be connected to the external electrodes through the through electrodes penetrating the body, thereby increasing capacitance.

In the description below, a configuration of the external electrodes will be described on the basis of the first external electrode 141 with reference to FIG. 2. The description of the first external electrode 141 may be applied to the second to fourth external electrodes 142, 143, and 144.

Figure 2:
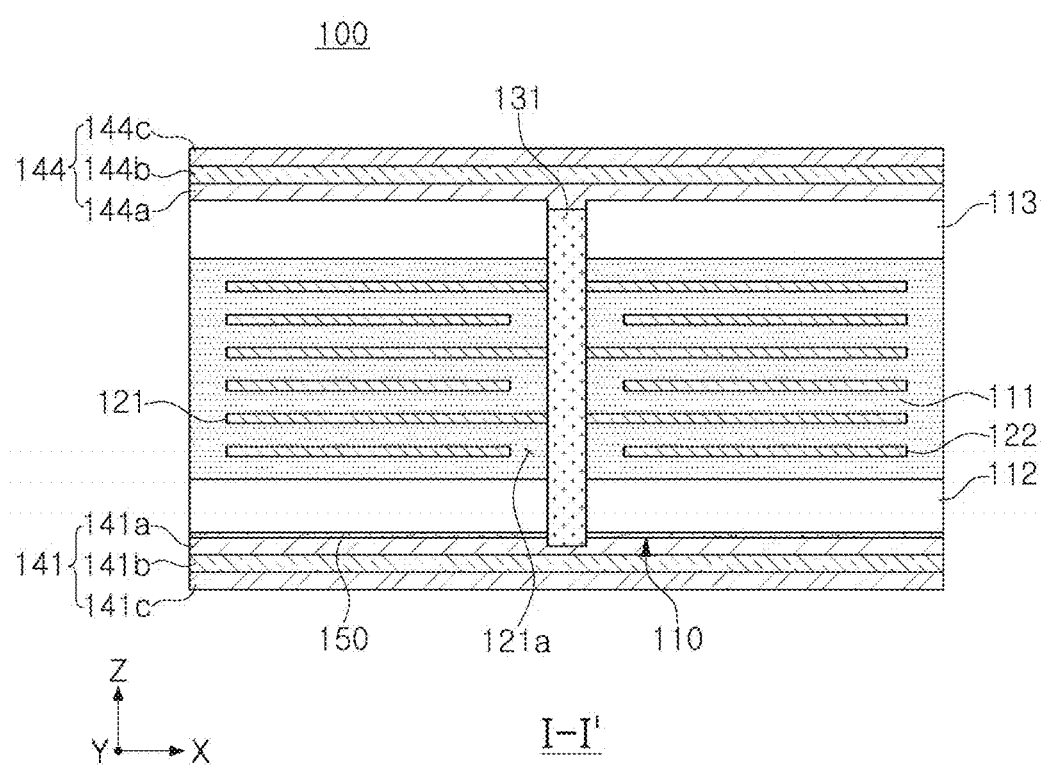
FIG. 2 is a cross-sectional diagram taken along line I-I' in FIG. 1.
Figure 3A:
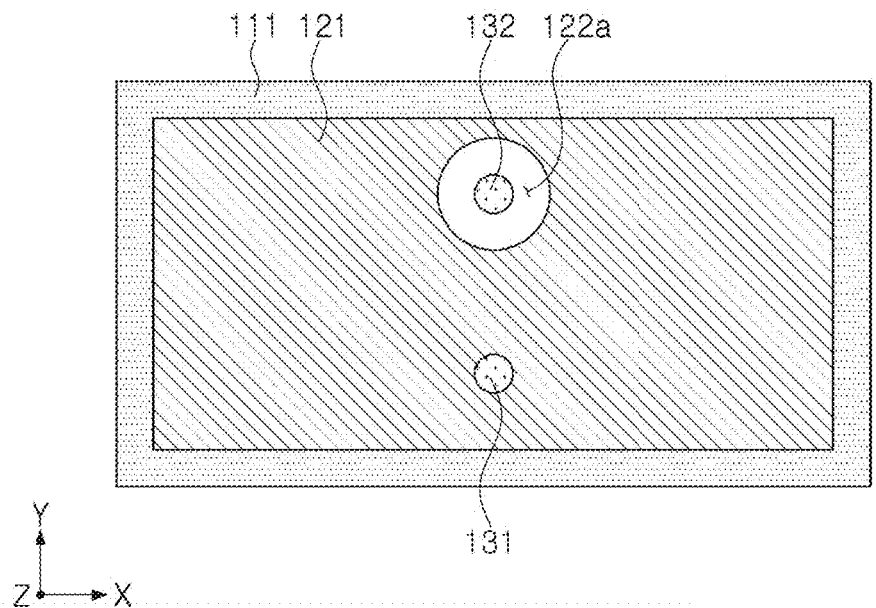
FIGS. 3A and 3B are cross-sectional diagrams taken in an X direction and a Y direction illustrated in FIG. 1.
Figure 3B:
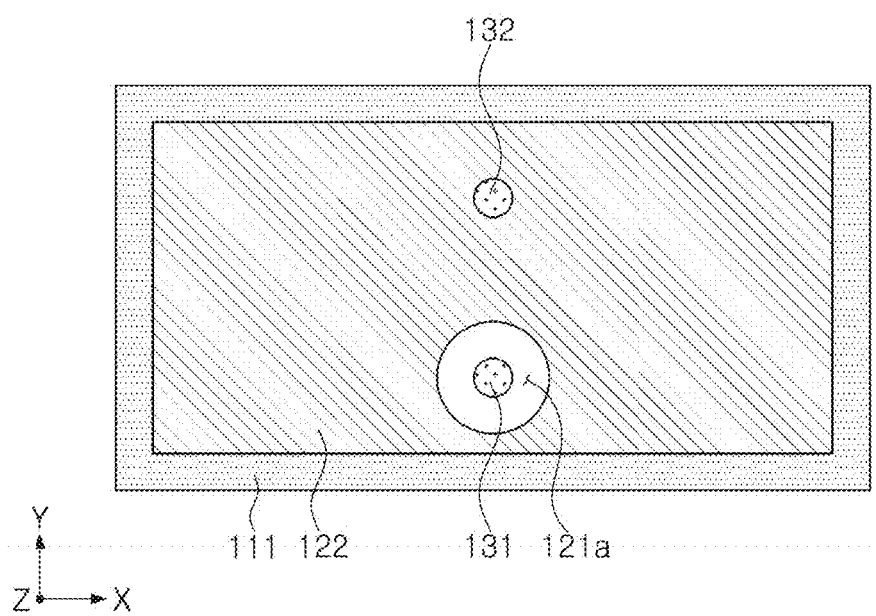

Referring to FIG. 2, the first external electrode 141 may include a first sintered electrode 141a, and first and second plating layers 141b and 141c. The first sintered electrode 141a may include one or more materials from among silver (Ag), palladium (Pd), gold (Au), platinum (Pt), nickel (Ni), tin (Sn), copper (Cu), tungsten (W), titanium (Ti), and alloys thereof, and may be configured as a sintered electrode formed by sintering a conductive paste including nickel (Ni), for example. When the external electrode is formed as a sintered electrode, the first sintered electrode 141, the external electrode may be simultaneously sintered with the body and the internal electrodes, and cohesion strength between the body and the external electrode may improve.

In an exemplary embodiment, an arithmetical average roughness (Ra) of a surface of each of the first to fourth external electrodes 141, 142, 143, and 144 may be within a range of 1 nm to 100 nm. In the exemplary embodiment, the term "arithmetical average roughness (Ra)" may refer to an average roughness value of a distance to a virtual central line, and the notion that the external electrode has an arithmetical average roughness (Ra) of 1 nm to 100 nm may indicate that the external electrode may have the above-mentioned range of surface roughness, and that the external electrode may have the artificially configured surface roughness satisfying the above-mentioned range.

The arithmetical average roughness (Ra) may be calculated by disposing a virtual central line with respect to roughness formed on surfaces of the first to fourth external electrodes 141, 142, 143, and 144, measuring each distance (e.g., r1, r2, r3 . . . rn) with reference to the virtual central line having the roughness, and calculating an average value of the distances using the equation below, and a value obtained from the calculation may be determined as the arithmetical average roughness (Ra) of the dielectric layer.

$$Ra = \frac{\sum_{1}^{n} r_n}{n}$$ [Equation 1]

The external electrodes having the arithmetical average roughness (Ra) satisfying the above-mentioned range may be formed through physical or chemical surface modification. A method of the surface modification is not limited to any particular method as long as the above-mentioned roughness may be obtained. For example, a surface process using an acid or alkaline solution, a physical grinding process using a grinding material, or the like, may be used.

Generally, as an oxide layer may be formed on a surface of a sintered electrode including nickel during a sintering process, it may be difficult to form a plating layer, a plating layer may be easily separated, or there may be other issues. When a surface of the external electrode in the exemplary embodiment is reformed to have an arithmetical average roughness (Ra) satisfying the above-mentioned range, an oxide layer may be removed, or a surface having a certain roughness may be formed. Accordingly, adhesion force between the external electrode and a plating layer may improve, and the separation of a plating layer may be prevented.

The first plating layer 141b may include nickel, and the second plating layer 141b may include copper or tin. As the first plating layer 141b includes nickel, adhesion force with the first sintered electrode 141a may improve. Also, as the second plating layer 141b includes copper or tin, the external electrode having improved conductivity, improved plating adhesion properties, and improved soldering properties may be provided.

In an exemplary embodiment, a thickness of each of the first to fourth external electrodes 141, 142, 143, and 144 may be within a range of 3 μm to 30 μm. A thickness of each of the first to fourth external electrodes 141, 142, 143, and 144 may refer to an overall thickness of the external electrode including the sintered electrodes, the first plating layer, and the second plating layer layered therein, and may refer to a distance perpendicular to a surface of the external electrode from the body. By configuring a thickness of the external electrodes as above, when the multilayer ceramic capacitor is mounted on or embedded in a substrate, the multilayer ceramic capacitor may not occupy a large area and may have improved mounting properties.

FIGS. 4 to 7 are diagrams illustrating a multilayer ceramic capacitor according to another exemplary embodiment. In the description below, another example of a multilayer ceramic capacitor will be described with reference to FIGS. 4 to 7.

A multilayer ceramic capacitor 200 in the exemplary embodiment may include a body 210 in which a first internal electrode 221, a dielectric layer 211, and a second internal electrode 222 are layered, first to fourth connection electrodes 231, 232, 233, and 234, and first to fourth external electrodes 241, 242, 243, and 244. The compositions and configurations of the dielectric layer 211, the first and second internal electrodes 221 and 222, and the first to fourth connection electrodes 231, 232, 233, and 234 may be the same as in the aforementioned exemplary embodiments, and thus, the descriptions thereof will not be repeated.

The multilayer ceramic capacitor 200 in the exemplary embodiment may include the first connection electrode 231, the second connection electrode 232, the third connection electrode 233, and the fourth connection electrode 234. The first and fourth connection electrodes 231 and 234 may be electrically connected to the first and second external electrodes 241 and 244, and the second and third connection electrodes 232 and 233 may be electrically connected to the third and fourth external electrodes 243 and 242. As described above, as a plurality of the connection electrodes connecting the first external electrode and the second electrode, and the third external electrode and the fourth external electrode are provided, cohesion force between the external electrodes and the body may improve.

Figure 6A:
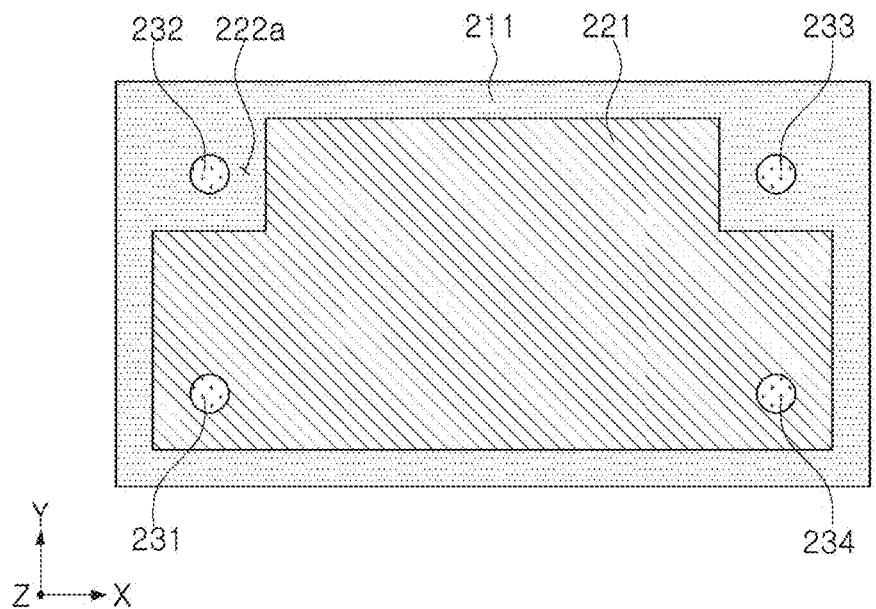
FIGS. 6A and 6B are cross-sectional diagrams taken in an X direction and a Y direction illustrated in FIG. 4.
Figure 6B:
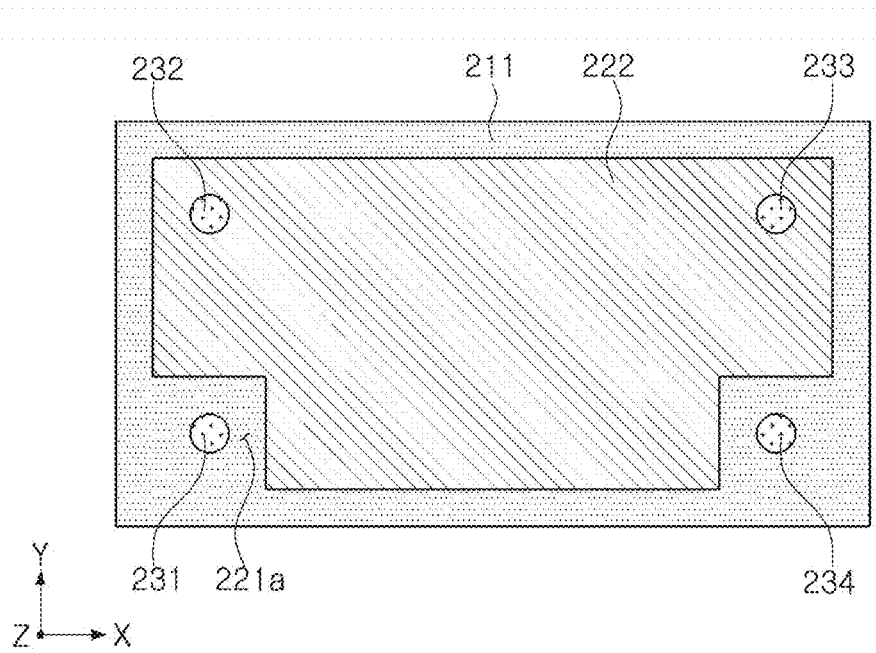

FIG. 6 is a cross-sectional diagram illustrating shapes of the first internal electrode 221 and the second internal electrode 222. Referring to FIG. 6, each of the first internal electrode 221 and the second internal electrode 222 may have a T-shaped form, and may be disposed in point-symmetry with each other. The first internal electrode 221 may have a T-shaped electrode pattern, and a region 222a in which an electrode is not disposed, a region where an electrode pattern is not formed, may be an insulating region. The second internal electrode 222 may have a T-shaped electrode pattern, and a region 221a in which an electrode is not disposed, a region where an electrode pattern is not formed, may be an insulating region.

In the multilayer ceramic capacitor having the above-described electrode pattern, the first and fourth connection electrodes 231 and 234 may be connected to the first internal electrode 221, and may penetrate the region 222a of the second internal electrode 222 in which an electrode is not disposed. Also, the second and third connection electrodes 232 and 233 may be connected to the second internal electrode 222, and may penetrate the region 222a of the first internal electrode 221 in which an electrode is not disposed. As the connection electrodes penetrate the region of the internal electrode in which an electrode is not disposed, the multilayer ceramic capacitor may have improved ESL by offsetting mutual inductance, and may have increased capacitance as compared to the configuration in which a via hole is formed on an internal electrode.

Figure 7A:
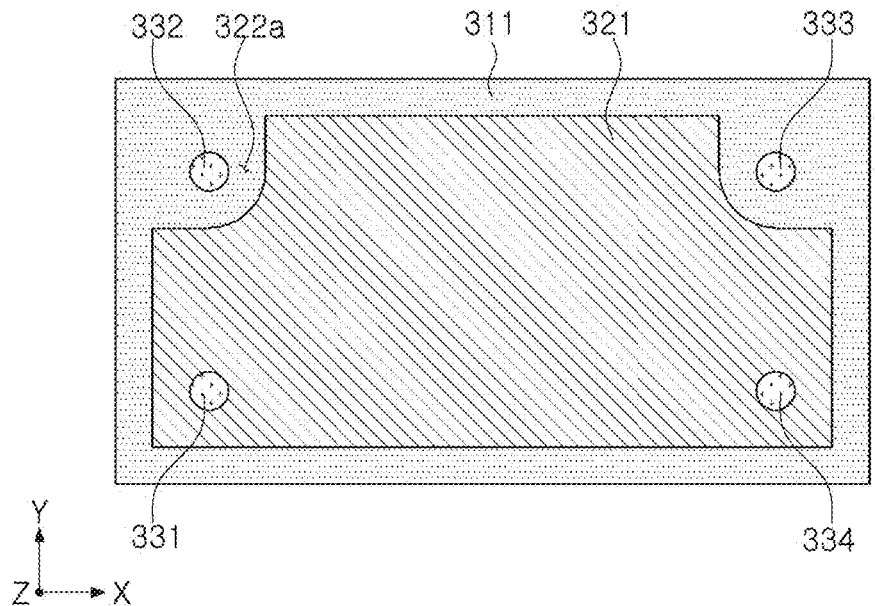
FIGS. 7A and 7B are cross-sectional diagrams taken in an X direction and a Y direction illustrated in FIG. 4, illustrating a multilayer ceramic capacitor according to another exemplary embodiment of the present disclosure.
Figure 7B:
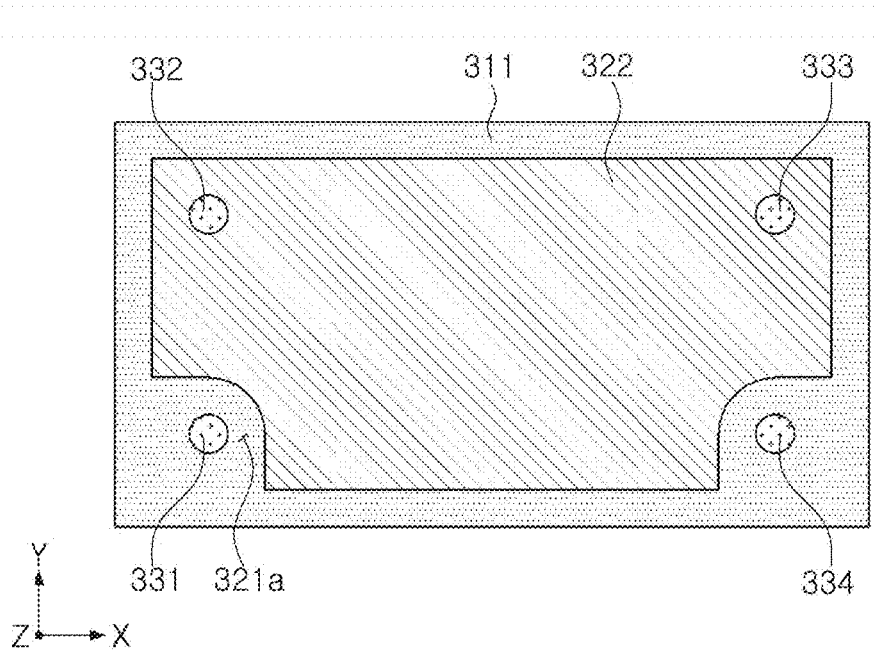

In an exemplary embodiment, each of regions 321a and 322a of first and second internal electrodes 321 and 322 in which an internal electrode is not disposed may have a round shape. Referring to FIG. 7, the first internal electrode 321 may have a T-shaped electrode pattern, and the region 322a in which an internal electrode is not disposed may have a round shape. The second internal electrode 322 may have a T-shaped electrode pattern, and the region 321a in which an internal electrode is not disposed may have a round shape. When a recessed portion of the internal electrode has a round shape as described above, capacitance may improve.

In the exemplary embodiment described above, the region in which an internal electrode is not disposed may have a rectangular shape or a round shape, but a shape of the internal electrode pattern is not limited thereto. The internal electrode pattern may have a triangular shape, a polygonal shape, or various other shapes, for example.

Figure 8A:
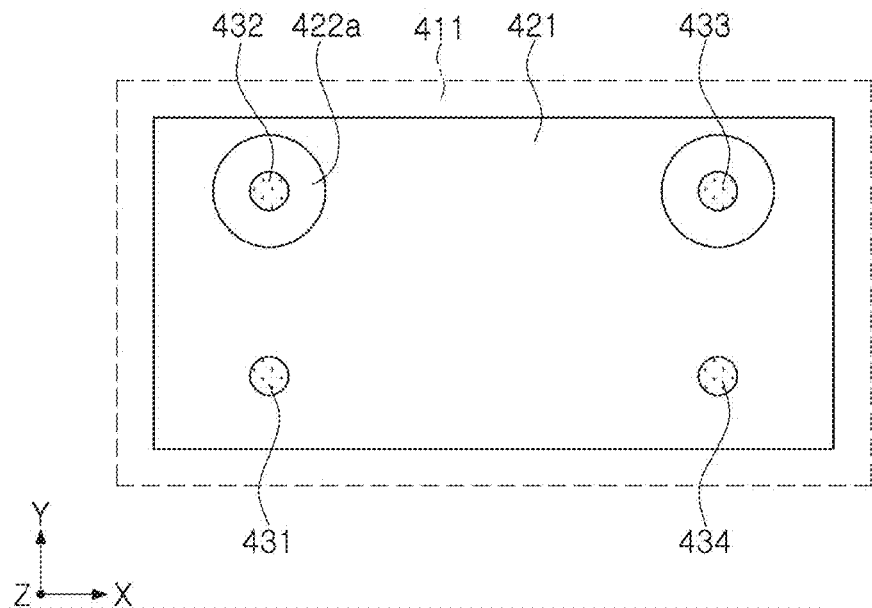
FIGS. 8A and 8B are cross-sectional diagrams taken in an X direction and a Y direction illustrated in FIG. 4, illustrating a multilayer ceramic capacitor according to another exemplary embodiment of the present disclosure.
Figure 8B:
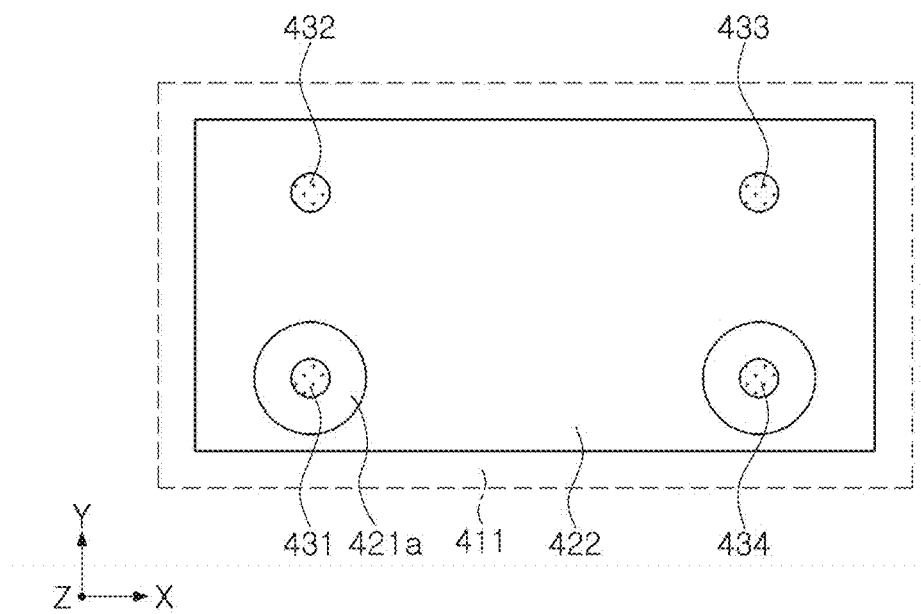
Figure 9:
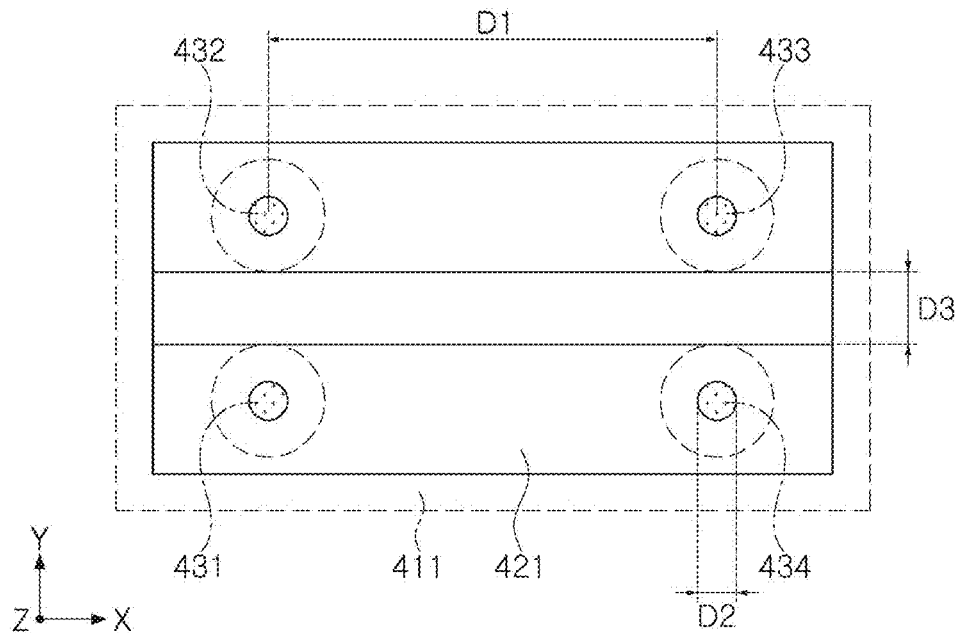
FIG. 9 is a plan diagram illustrating a multilayer ceramic capacitor illustrated in FIG. 4, viewed in an S1 direction.

FIGS. 8 and 9 are cross-sectional diagrams illustrating another exemplary embodiment of the present disclosure. Referring to FIGS. 8 and 9, first and second internal electrodes 421 and 422 may be disposed in point-symmetry, and each of the first and second internal electrodes 421 and 422 may have a rectangular shape. The first internal electrode 421 may include second and third via holes 422a, and the second internal electrode 422 may include first and fourth via holes 421a. First and fourth connection electrodes 431 and 434 may be connected to the first internal electrode 421, and may penetrate the first and fourth via holes 421a of the second internal electrode 422. Second and third connection electrodes 432 and 433 may be connected to the second internal electrode 422, and may penetrate the second and third via holes 422a of the first internal electrode 421. As the first and fourth connection electrodes 431 and 434 penetrate the first and fourth via holes 421a of the second internal electrode 422, the first and fourth connection electrodes 431 and 434 may be electrically insulated with the second internal electrode 422. Also, as the second and third connection electrodes 432 and 433 penetrate the second and third via holes 422a of the first internal electrode 421, the second and third connection electrodes 432 and 433 may be electrically insulated from the first internal electrode 421.

FIG. 9 illustrates a gap D1 between the first and fourth connection electrodes 431 and 434 or between the second and third connection electrodes 432 and 433, a diameter D2 of each of the first to fourth connection electrodes 431, 432, 433, and 434, and a gap D3 between the first and second via holes or between the third via hole and the fourth via hole.

Referring to FIG. 9, a ratio D1/D3 may be 2.08 to 4.7. The ratio D1/D3 may be 2.08 or higher, 2.20 or higher, 2.30 or higher, 2.40 or higher, 2.50 or higher, 2.60 or higher, 2.70 or higher, 2.80 or higher, 2.90 or higher, 3.00 or higher, 3.05 or higher, 3.10 or higher, or 3.15 or higher, and may be 4.700 or lower, 4.695 or lower, 4.690 or lower, or 4.688 or lower, but an exemplary embodiment thereof is not limited thereto. When the ratio D1/D3 satisfies the above-mentioned ranges, equivalent series inductance (ESL) may decrease, and when the ratio is 3.125 or higher, an effect of a reduction in ESL may increase.

In the exemplary embodiment, a ratio D2/D3 may be within a range of 0.375 to 0.52. The ratio D2/D3 may be 0.375 or higher, 0.380 or higher, 0.385 or higher, 0.390 or higher, 0.395 or higher, 0.400 or higher, 0.405 or higher, or 0.410 or higher, and may be 0.52 or lower. When the ratio D2/D3 satisfies the above-mentioned ranges, ESL may decrease. When the ratio D2/D3 is 0.41 or higher, an effect of reduction in ESL may increase, and when the ratio is 0.52 or higher, capacitance may decrease.

Figure 4:
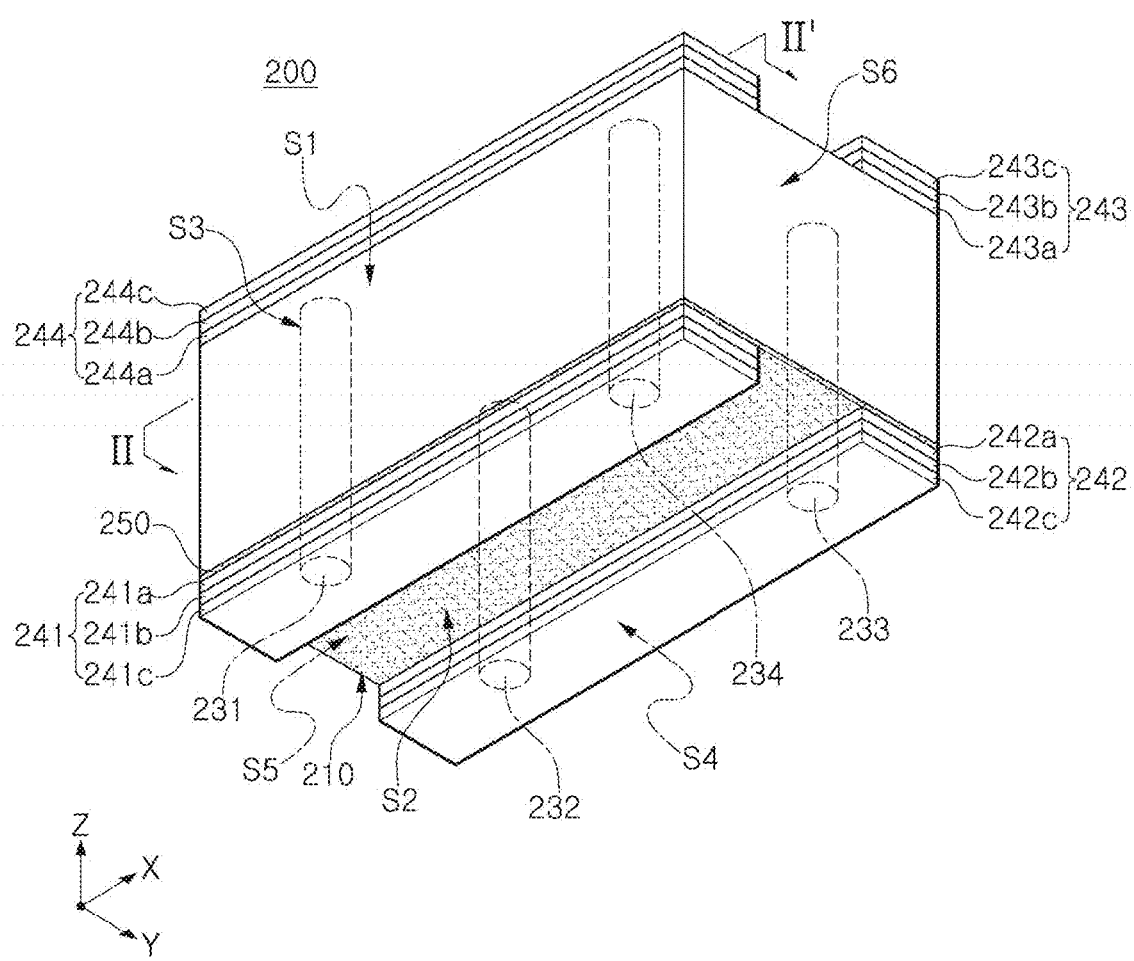
FIG. 4 is a perspective diagram illustrating a multilayer ceramic capacitor according to another exemplary embodiment of the present disclosure.
Figure 5:
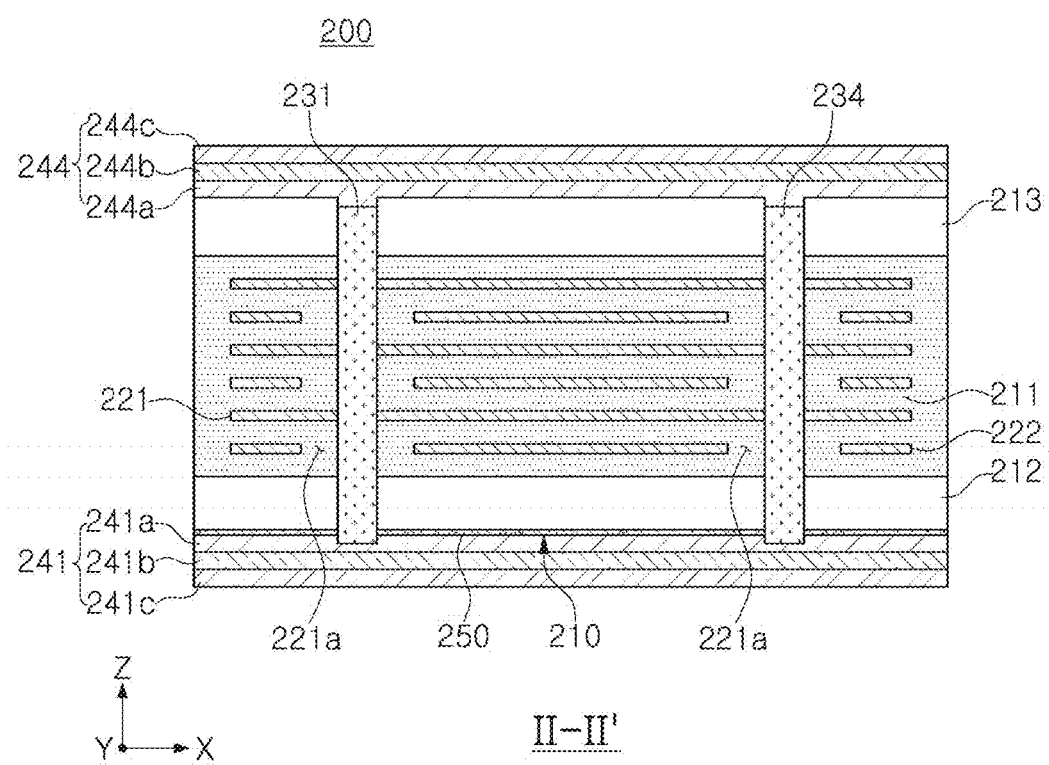
FIG. 5 is a cross-sectional diagram taken along line II-II' in FIG. 4.

FIGS. 10 to 14 illustrate a method of manufacturing the multilayer ceramic capacitor illustrated in FIGS. 1 and 4. A method of manufacturing the multilayer ceramic capacitor illustrated in FIGS. 1 and 4 will be described with reference to FIGS. 10 to 14.

Figure 10:
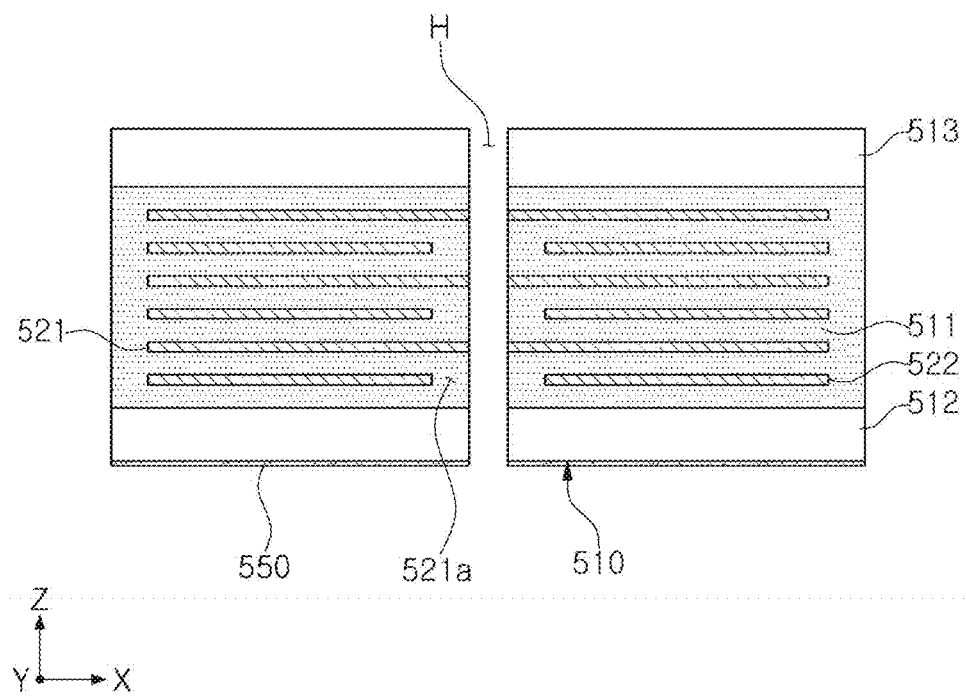
FIGS. 10 to 14 are diagrams illustrating processes of manufacturing a multilayer ceramic capacitor according to an exemplary embodiment of the present disclosure.

As illustrated in FIG. 10, green sheets formed of dielectric layers, on one surface of which a paste including a conductive metal is printed to a certain thickness, may be layered, thereby preparing a body including dielectric layers and first and second internal electrodes disposed with the dielectric layer interposed therebetween. A first cover portion 512 and a second cover portion 513 may be formed by layering the dielectric layers which do not include the internal electrodes on upper and lower portions of the body 210. If desired, an identifier 550 may be provided.

Figure 11:
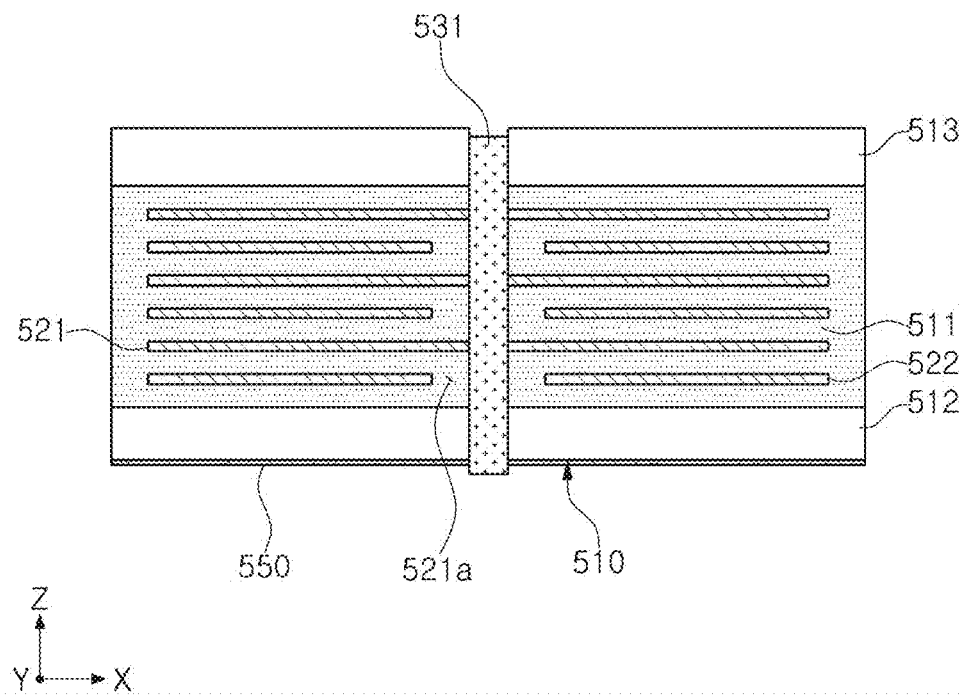
Figure 12:
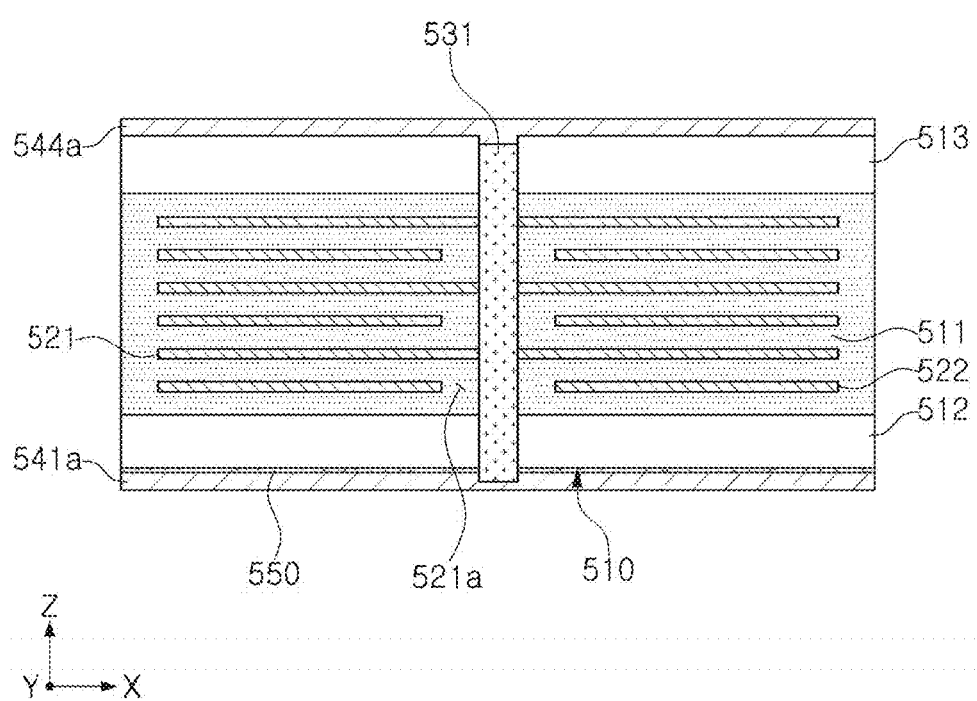
Figure 13:
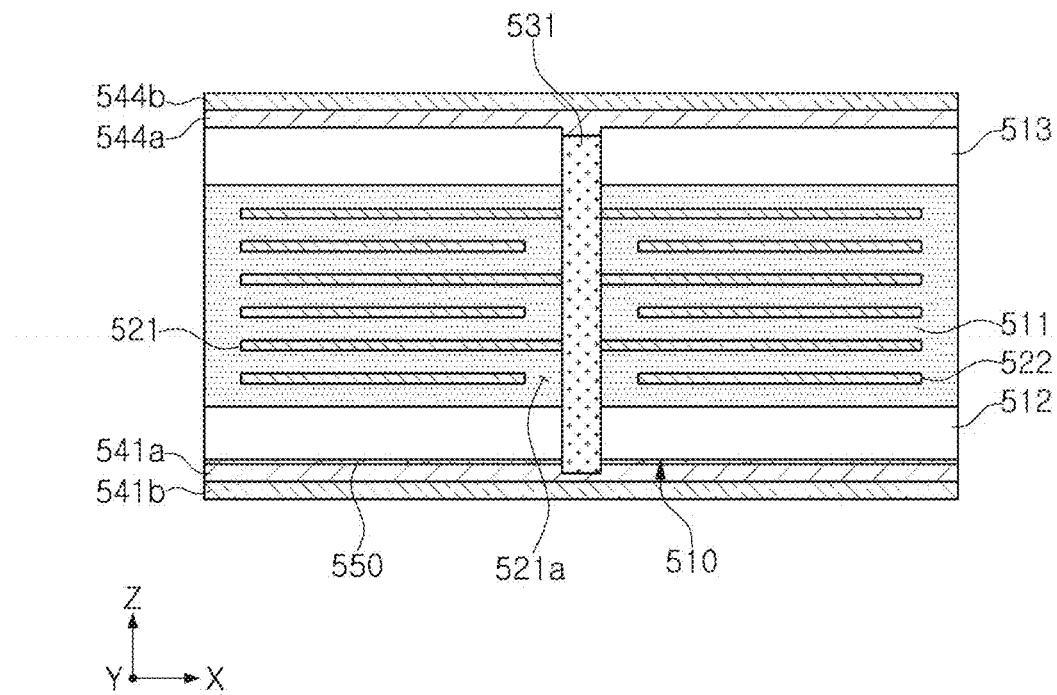

After forming the cover portions, a via H may be formed in the body using a laser drill, a mechanical pin puncher, or the like. The via H may be coated with a conductive paste, or may be filled with a conductive material through a plating process, or the like, thereby forming first and second through electrodes 531 and 532, as illustrated in FIG. 11.

First to fourth external electrodes 541, 542, 543, and 544 connected to the first and second through electrodes 531 and 532 may be formed on one surface of the body 510.

Figure 14:
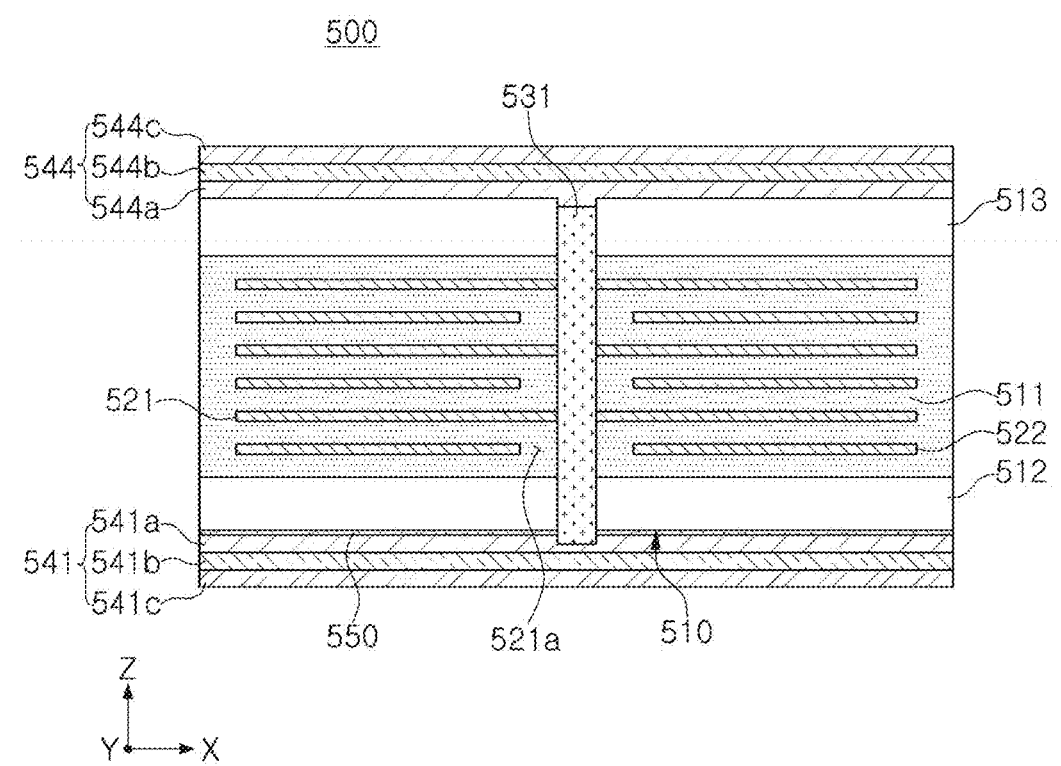

For example, the forming the first to fourth external electrodes may include forming first to fourth sintered electrodes including nickel on the body (FIG. 12), forming a first plating layer on each of the first to fourth sintered electrodes (FIG. 13), and forming a second plating layer on the first plating layer (FIG. 14).

The sintered electrodes may be formed by coating a surface with a conductive paste including nickel and sintering the paste, the first plating layer may include nickel and may be formed by an electrical or chemical plating method, and the second plating layer may include copper or tin and may be formed by an electrical or chemical plating method.

After forming the sintered electrode layers, a bake-out process and a sintering process may be performed, the first plating layer and the second plating layer may be formed, thereby manufacturing the multilayer ceramic capacitor illustrated in FIGS. 1 and 4.

According to the aforementioned exemplary embodiments, in the multilayer ceramic capacitor, the identifier may be disposed on a surface of the body such that an upper portion and a lower portion may easily be identified.

Also, a direction of a protrusion in which the through electrode protrudes may be identified, thereby improving cohesion force when the multilayer ceramic capacitor is mounted on a substrate.

Further, as a surface of the external electrode may have a certain level of arithmetical average roughness (Ra), a nickel plated layer may be formed on the external electrode.

In addition, the multilayer ceramic capacitor having a low profile form and having improved adhesion force with a substrate may be provided.

While the exemplary embodiments have been shown and described above, it will be apparent to those skilled in the art that modifications and variations could be made without departing from the scope of the present invention as defined by the appended claims.

What is claimed is:

1. A multilayer ceramic capacitor, comprising:
a body including a dielectric layer and first and second internal electrodes disposed with the dielectric layer interposed therebetween in a stacking direction, the body including a first surface and a second surface opposing each other in the stacking direction;
a first through electrode penetrating the body and connected to the first internal electrode;
a second through electrode penetrating the body and connected to the second internal electrode;
first and second external electrodes disposed on the first surface and the second surface, respectively, and connected to the first through electrode; and
third and fourth external electrodes disposed on the first surface and the second surface, respectively, to be spaced apart from the first and second external electrodes and connected to the second through electrode,
wherein the first surface has different brightness or color from the second surface,
wherein the first and second through electrodes protrude outwardly from the body through, among the first and second surfaces, only one of the first surface or the second surface of the body, and
wherein the second and fourth external electrodes penetrate the second surface so as to directly contact the first and second through electrodes, respectively, inside the body.

2. The multilayer ceramic capacitor of claim 1, wherein a surface roughness of each of the first to fourth external electrodes is in a range of 1 nm to 100 nm.

3. The multilayer ceramic capacitor of claim 1, wherein the first to fourth external electrodes include a first plating layer and a second plating layer layered in order on a sintered electrode.

4. The multilayer ceramic capacitor of claim 3, wherein the first plating layer includes nickel.

5. The multilayer ceramic capacitor of claim 3, wherein the second plating layer includes copper or tin.

6. The multilayer ceramic capacitor of claim 1, wherein the first and second internal electrodes include nickel.

7. The multilayer ceramic capacitor of claim 1, wherein the first to fourth external electrodes are sintered electrodes including nickel.

8. The multilayer ceramic capacitor of claim 1, wherein the first to fourth external electrodes are sintered to the body.

9. The multilayer ceramic capacitor of claim 1, wherein a thickness of each of the first to fourth external electrodes in the stacking direction is within a range of 1 μm to 10 μm.

10. The multilayer ceramic capacitor of claim 1, wherein a thickness of the body in the stacking direction is 100 μm or less.

11. A multilayer ceramic capacitor, comprising:
a body including a dielectric layer and first and second internal electrodes disposed with the dielectric layer interposed therebetween in a stacking direction, and first and second cover portions respectively disposed on a lower portion of a lowermost internal electrode and on an upper portion of an uppermost internal electrode of the plurality of the first and second internal electrodes in the stacking direction, the body including a first surface and a second surface opposing each other in the stacking direction;
a first through electrode penetrating the body and connected to the first internal electrode;
a second through electrode penetrating the body and connected to the second internal electrode;
first and second external electrodes disposed on the first surface and the second surface, respectively, and each connected to the first through electrode;
third and fourth external electrodes disposed on the first surface and the second surface, respectively, to be spaced apart from the first and second external electrodes and each connected to the second through electrode; and
an identifier disposed on, among the first and second surfaces, only one of the first surface or the second surface of the body,
wherein a thickness of the identifier in the stacking direction is smaller than a thickness of the first and second cover portions in the stacking direction.

12. The multilayer ceramic capacitor of claim 11, wherein the first and second through electrodes protrude outwardly from the body through the first surface.

13. The multilayer ceramic capacitor of claim 12, wherein a surface roughness of each of the first to fourth external electrodes is in a range of 1 nm to 100 nm.

14. The multilayer ceramic capacitor of claim 12, wherein the first to fourth external electrodes include a first plating layer and a second plating layer layered in order on a sintered electrode.

15. The multilayer ceramic capacitor of claim 14, wherein the first plating layer includes nickel.

16. The multilayer ceramic capacitor of claim 14, wherein the second plating layer includes copper or tin.

17. The multilayer ceramic capacitor of claim 12, wherein the first and second internal electrodes include nickel.

18. The multilayer ceramic capacitor of claim 12, wherein the first to fourth external electrodes are sintered electrodes including nickel.

19. The multilayer ceramic capacitor of claim 12, wherein the first to fourth external electrodes are sintered to the body.

20. The multilayer ceramic capacitor of claim 12, wherein a thickness of each of the first to fourth external electrodes in the stacking direction is within a range of 1 μm to 10 μm.

21. The multilayer ceramic capacitor of claim 12, wherein a thickness of the body in the stacking direction is 100 μm or less.

22. The multilayer ceramic capacitor of claim 12, wherein the identifier is a dielectric layer including ceramic particles having a size different from a size of remaining ceramic particles included in the body.

23. The multilayer ceramic capacitor of claim 12, wherein the identifier includes ceramic particles and one or more metal oxides selected from among Ni, Mn, Cr, Mg, Y, and V, or BaSiO3, or CaSiO3.

24. The multilayer ceramic capacitor of claim 12, wherein the body further includes a third surface and a fourth surface opposing each other in a width direction, and a fifth surface and a sixth surface opposing each other in a length direction.

* * * * *